United States Patent
Kwon et al.

(10) Patent No.: US 9,693,290 B2
(45) Date of Patent: *Jun. 27, 2017

(54) APPARATUS AND METHOD FOR DYNAMICALLY ALLOCATING RADIO RESOURCE

(71) Applicant: LG ELECTRONICS INC., Seoul (KR)

(72) Inventors: Yeong Hyeon Kwon, Anyang-si (KR); Seung Hee Han, Anyang-si (KR); Hyun Hwa Park, Anyang-si (KR); Dong Cheol Kim, Anyang-si (KR); Hyun Woo Lee, Anyang-si (KR); Min Seok Noh, Anyang-si (KR); Ae Ran Youn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

This patent is subject to a terminal disclaimer.

(21) Appl. No.: 14/819,036

(22) Filed: Aug. 5, 2015

(65) Prior Publication Data

US 2015/0341935 A1 Nov. 26, 2015

Related U.S. Application Data

(63) Continuation of application No. 12/375,380, filed as application No. PCT/KR2007/003634 on Jul. 27, 2007, now Pat. No. 9,131,430.

(30) Foreign Application Priority Data

Jul. 28, 2006 (KR) .................. 10-2006-0071585

(51) Int. Cl.
*H04W 48/16* (2009.01)
*H04W 48/12* (2009.01)
(Continued)

(52) U.S. Cl.
CPC ............ *H04W 48/16* (2013.01); *H04L 12/66* (2013.01); *H04W 48/12* (2013.01);
(Continued)

(58) Field of Classification Search
CPC ... H04W 48/16; H04W 48/12; H04W 72/045; H04W 72/085
(Continued)

(56) References Cited

U.S. PATENT DOCUMENTS 7,269,151 B2 * 9/2007 Diener ................. H04L 1/1664
370/329
7,283,492 B2 10/2007 Malladi et al.
(Continued)

FOREIGN PATENT DOCUMENTS

CN 1717085 A 1/2006
JP 9-214422 A 8/1997
(Continued)

OTHER PUBLICATIONS

Chen et al., Next Generation Wireless Systems and Networks, Wiley, Apr. 2006, pp. 393-396.
(Continued)

*Primary Examiner* — Ronald B Abelson
(74) *Attorney, Agent, or Firm* — Birch, Stewart, Kolasch & Birch, LLP

(57) ABSTRACT

A method for a terminal to communicate with a network using a plurality of frequency band cells, and the terminal for performing the method are discussed. The method according to one embodiment includes acquiring frequency bands information on which of frequency bands measurement can be performed and on which of the frequency bands measurement cannot be performed. The frequency bands information is acquired from outside of the terminal. The method according to the embodiment further includes per-
(Continued)

forming measurement on the frequency bands on which measurement can be performed based on the frequency bands information; acquiring measurement result information on the plurality of frequency band cells based on the measurement; and communicating data with a network on the plurality of frequency band cells considering the measurement result information.

10 Claims, 10 Drawing Sheets

(51) Int. Cl.
| | |
|---|---|
| *H04W 72/04* | (2009.01) |
| *H04W 72/08* | (2009.01) |
| *H04L 12/66* | (2006.01) |
| *H04W 28/20* | (2009.01) |
| *H04W 72/02* | (2009.01) |
| *H04W 74/08* | (2009.01) |
| *H04W 88/06* | (2009.01) |

(52) U.S. Cl.
CPC ..... *H04W 72/0453* (2013.01); *H04W 72/085* (2013.01); *H04W 28/20* (2013.01); *H04W 72/02* (2013.01); *H04W 74/0808* (2013.01); *H04W 88/06* (2013.01)

(58) Field of Classification Search
USPC ........................................................ 370/252
See application file for complete search history.

(56) References Cited

U.S. PATENT DOCUMENTS

| | | | |
|---|---|---|---|
| 7,859,985 B2* | 12/2010 | Schmidl | ................ H04L 1/1845 370/208 |
| 2003/0078037 A1 | 4/2003 | Auckland et al. | |
| 2003/0210680 A1 | 11/2003 | Rao et al. | |
| 2005/0143123 A1 | 6/2005 | Black et al. | |
| 2005/0207335 A1 | 9/2005 | Schmidl et al. | |
| 2006/0013182 A1 | 1/2006 | Balasubramanian et al. | |
| 2006/0030362 A1 | 2/2006 | Fukuda | |
| 2006/0116123 A1* | 6/2006 | Purnadi | ................... H04L 5/023 455/435.1 |
| 2007/0133387 A1* | 6/2007 | Arslan | ................... H04B 1/719 370/206 |
| 2007/0189199 A1 | 8/2007 | Nishio | |

FOREIGN PATENT DOCUMENTS

| | | |
|---|---|---|
| JP | 2002-135304 A | 5/2002 |
| JP | 2002-335569 A | 11/2002 |
| JP | 2006-515120 A | 5/2006 |
| WO | WO 00/79823 A1 | 12/2000 |
| WO | WO 2004/028057 A2 | 4/2004 |
| WO | WO 2005/067492 A2 | 7/2005 |
| WO | WO 2005/074159 A1 | 8/2005 |
| WO | WO 2005/096522 A1 | 10/2005 |
| WO | WO 2006/056846 A1 | 6/2006 |

OTHER PUBLICATIONS

Tafazolli et al., Technologies for the Wireless Future, Wireless World Research Forum (WWRF), vol. 2, Wiley, Apr. 2006, Chapters 6.2.9 and 8.5, pp. 146-149 and 387-415.

* cited by examiner

APPARATUS AND METHOD FOR DYNAMICALLY ALLOCATING RADIO RESOURCE

CROSS-REFERENCE TO RELATED APPLICATIONS

This application is a Continuation of copending U.S. application Ser. No. 12/375,380, filed on Jul. 1, 2009, which was filed as the National Phase of PCT International Application No. PCT/KR2007/003634, filed Jul. 27, 2007, which claims priority under 35 U.S.C. § 119(a) to Patent Application No. 10-2006-0071585, filed in Korea on July 28, 2006, the contents of all of which are hereby expressly incorporated by reference into the present application.

BACKGROUND OF THE INVENTION

Field of the Invention

The present invention relates to a communication device and method that dynamically uses frequency resources, and more particularly, to a mobile terminal and a communication method that can dynamically allocate frequencies.

Discussion of the Related Art

Current wireless communication services perform data transmission and reception using fixed bandwidths. Mobile communication systems maximize their performance through the arrangement of frequencies in cells and resources allocated to a specific band. A technology of transmitting and receiving signals using a fixed band is implemented through an invariant frequency range. A general method to provide a higher service quality (for example, a higher throughput or a greater number of users) while complying with current system protocols is to divide cells into smaller sections or to extend the existing system protocols according to the demand and then to install a new infrastructure.

Conventional methods of using frequency resources are divided into a technique based on fixed bandwidths and a technique based on scalable (or variable) bandwidths.

Systems that use the fixed bandwidth technique define protocols of services using various transmission/reception technologies suitable for specific bands. These systems are characterized in that they provide services based on fixed bands. So, if it is needed to change their protocols, it is necessary to change their entire service systems.

On the other hand, the scalable bandwidth technique, which is currently predominant, selectively applies various bandwidth options. For such scalable bandwidth protocols, it is easier to change bandwidths and to control the quality of service than fixed bandwidth protocols. However, in situations where actual services are provided, the scalable bandwidth system operates in the same manner as the fixed bandwidth system.

In summary, the scalable bandwidth system has an advantage in that no change is made to technologies employed in the system even when frequency bands have been widened or narrowed through the scalable bandwidth technique. The scalable bandwidth system can also change the quality of service without increasing the complexity of hardware since the employed technologies are not changed even if frequency bands are changed.

A new technique as an alternative to the above techniques is a Cognitive Radio (CR) technique. Mitola has suggested the CR technique in 1999 with an intention to efficiently use frequency bands. The CR technique is implemented basically based on Software-Defined Radio (SDR). The CR technique scans (or searches) frequency bands to select a spectrum that is not in use and sets the selected spectrum as a basic communication band. That is, the CR technique can perform spectrum sensing. According to the CR technique, the system can make a standalone determination as to whether to change the SDR architecture according to the type of a service found through the searching, to change the service type or the quality of service.

Taking into consideration both the fact that various wireless services are provided currently and the basic target concept of the CR technique, we can see that future wireless terminals will have an integrated form. That is, future wireless terminals are expected to operate according to the CR technique. The IEEE 802.22 currently employs the CR technique as a method to share TV bands to provide Wireless Regional Area Network (WRAN) services.

Some features of the CR technique are similar to those of some communication standards (or protocols) that use Industrial Scientific Medical (ISM) bands. Some standards that perform communication using the ISM bands provide a protocol to recognize frequency bands and to prevent collision in wireless (or radio) resources using a method called "coexistence". The coexistence method also uses a variety of wireless resources through frequency detection and has common features with the CR technique.

In summary, if the communication methods are divided according to the frequency management techniques, they can be divided into the fixed bandwidth communication method, the scalable bandwidth communication method, and the CR communication method. Reference will now be made to the communication methods according to the various techniques with reference to the drawings.

First, reference is made to the fixed bandwidth communication method.

FIG. 1 illustrates use of wireless resources in the fixed bandwidth communication method.

Systems such as current mobile communication systems (CDMA, GSM, etc), wireless LAN (IEEE 802.11, HiperLAN, etc), or wireless PAN (IEEE 802.15) provide services using fixed bandwidths determined at an initial standardization stage. These bandwidths are some of the public bandwidths or the bandwidths, the use of frequencies of which has been authorized by the government. The fixed bandwidth communication method is characterized in that there is no increase or decrease in the frequency bandwidth with time. Thus, services provided in the fixed bandwidth are optimized for the bandwidth. That is, the fixed bandwidth communication method uses a predetermined bandwidth, regardless of the current amount of traffic.

Reference will now be made to the scalable bandwidth communication method.

Services using scalable bandwidths can be divided into two types. Services of the first type are provided in the case where the terminal uses a variable bandwidth while the base station uses a constant bandwidth. Services of the second type are provided in the case where both the base station and the terminal use variable bandwidths.

An example of the first type is shown in FIG. 2. The example of FIG. 2 may be a service of the IEEE 802.16 or 802.20 protocol using OFDM. The example of FIG. 2 may also be a service of the 3GPP Long Term Evolution (LTE) or the like. In the CDMA mode, the example of FIG. 2 may be a service of Evolution Data Only (EV-DO) or Evolution Data and Voice (EV-DV), which is a method of grouping and allocating channels to terminals. In the example of FIG. 2, the total bandwidth used by the base station is fixed and the base station allocates a specific bandwidth to the terminal.

The terminal receives services through the allocated bandwidth. The bandwidth used by the base station is determined during installation of the system.

Reference will now be made to the scalable bandwidth communication method that incorporates some features of the CR technique.

FIG. 3 illustrates a method of using wireless (or radio) resources in the scalable bandwidth communication method that incorporates some features of the CR technique. As shown in FIG. 3, the bandwidth through which the base station provides services may vary with time. The example of FIG. 3 may be that of the IEEE 802.22 protocol. The IEEE 802.22 protocol is a service model created by incorporating the features of the CR technique. That is, an available frequency band is detected in each time unit and the base station extends its services within the available bandwidth. Accordingly, terminals of the IEEE 802.22 standard (or protocol) must be able to accommodate all changing bandwidths. In the IEEE 802.22 standard, Wireless Regional Area Network (WRAN) services are provided by sharing TV bands and each service unit is provided using channels that are not used in other services, basically according to a channel combination/split method. That is, when the base station detects a TV channel that is not in use, the base station uses that TV channel to provide a WRAN service. If consecutive TV channels are available within the range specified in the standard, the channels are grouped to be used as a single band and it is possible to provide services using the entirety of the band. The terminal must recognize all such states of the channels of the base station and increase its receiving capability accordingly.

Reference will now be made to the CR technique. The CR technique is characterized in that it is not limited to a specific frequency management method. That is, the CR technique is characterized in that the configuration of a terminal changes according to frequency resources in order to more efficiently use the current spectrum (i.e., the frequency resources).

FIG. 4 illustrates how a terminal according to the CR technique (hereinafter referred to as a "CR terminal") uses wireless resources when some of the wireless resources are not in use.

As shown in FIG. 4, the CR terminal freely examines and selects a spectrum. That is, the CR terminal monitors spectrums as shown in FIG. 4 and thus can detect that wireless resources of bands 401 to 406 are not in use. Accordingly, first, the CR terminal can receive a general CR service through bands shown with a name "Conventional service with CR" in the bands 401 and 402. The CR terminal can also create a new service through the bands 401 and 402.

If the CR terminal detects that the wireless resources of the bands 401 and 402 are not available any longer after time "t1", the CR terminal can receive the service or provide a new service through the wireless resources of the band 403 after time "t1". If the wireless resources of the band 403 are not available any longer after time "t2", the CR terminal can select the wireless resources of the band 406 to continuously receive or provide the service after time "t2" as shown in FIG. 4.

If there are spectrum bands to be monitored and a region not in use is detected in the bands, the CR terminal receives a communication service that is provided according to the CR technique through the region. Of course, the service provided may be a fixed bandwidth service and may also be a scalable bandwidth service. The CR technique is characterized in that, because frequency resources that are in use change with time in contrast to the conventional services, it requires both a protocol to manage the change of the frequency resources and a process of learning the frequency resources. An example of the current standard having the characteristics of the CR technique is an IEEE 802.22 WRAN system.

One feature of the CR technique is that it freely uses frequency bands, compared to other techniques. In the scalable bandwidth communication method, bandwidths available in the communication system are preset although a bandwidth used changes with time and communication is performed while the used bandwidth changes within the preset bandwidths. However, the CR technique freely scans frequency bands without the preset restriction. The CR technique is also characterized in that, if an available band is detected, a service is received or created through the detected band.

Communication protocols using the fixed bandwidth technique and the scalable bandwidth technique have the following problems.

The current system needs to be modified when there is a demand of consumers in the future. To meet the demand of consumers, it is necessary to create a new standard and to provide a new system. In other words, systems using fixed bandwidths and systems using scalable bandwidths must always change their protocols at the desires of consumers. However, since it is difficult to fully meet the desires of consumers through a single service, various types of services are provided, thereby reducing the spectrum efficiency. Particularly, the use of spectrums locally and temporally changes at limited demands of users. That is, there is a problem in that the use of spectrums is inefficient when there are such limited demands of users. Thus, wireless terminals will evolve based on the CR technique in order to meet changing desires of users and to accommodate a variety of communication techniques.

However, no one has suggested a band utilization method and a communication method for the CR technique. The current discussions focus on how reconfiguration to recognize and determine frequency environments is implemented in an SDR terminal which accommodates the conventional type of wireless systems without change. Although this CR operation scenario has an advantage in that it integrates all wireless terminals, it has a problem in that it fails to consider an evolution toward efficient use of spectrums while fully satisfying changing desires of users.

To solve the above problems, one embodiment of the present invention suggests a communication method and device which can utilize idle spectrums.

Another embodiment of the present invention suggests a frequency utilization method and a communication device which efficiently address the demand of users.

The object of the present invention can be achieved by providing a mobile terminal including a communication module including a cognitive engine for searching frequency bands based on both a specific frequency policy and a service chosen by a user and selecting a specific frequency band from the searched frequency bands; and a communication system block including a platform block for performing configuration for the selected frequency band and at least one component block for performing data processing based on a specific protocol according to the configuration of the platform block.

Preferably, the mobile terminal is based on a CR technique.

Preferably, the mobile terminal further includes a policy engine for acquiring the specific frequency policy.

Preferably, the platform block performs spectrum sensing and spectrum configuration.

Preferably, the component block corresponds to a specific communication protocol.

Preferably, the component block performs communication under control of the platform block.

A communication method according to the present invention is a method for transmitting and receiving service data in a transmitting party, the method being capable of dynamically allocating frequencies and including searching frequency bands based on both a specific frequency policy and a service chosen by a user; determining a frequency band to be used by the transmitting party according to the searched result and establishing a connection for a platform block that performs configuration for the determined frequency band; and establishing a connection for at least one component block that transmits and receives service data through the determined frequency band.

The present invention can achieve the following advantages. First, the present invention allows efficient use of idle spectrums. A specific embodiment of the present invention also allows different providers to share spectrums allocated to the providers.

An embodiment of the present invention defines a comprehensive MAC/PHY format for CR terminals. This embodiment can provide a variety of qualities of service (QoS) since service types usable in CR communication devices are implemented in platform MAC/PHY blocks (MACs/PHYs). According to an embodiment, it is possible to effectively eliminate channel congestion that users feel for burst traffic, compared to the method of reducing the QoS provided to the users.

Each of the embodiments of the present invention suggests a standard protocol form that can evolve on its own. That is, the present invention can provide CR terminals with a comprehensive framework for both current wireless communication technologies and future communication technologies.

BRIEF DESCRIPTION OF DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

An embodiment of the present invention suggests a basic structure of a protocol for communication between a terminal based on the CR technique and a base station that supports the CR technique. Since the entirety of a communication system is defined with one protocol, the conventional communication protocols have a problem in that a change in the system due to a change in the policy of a company or the demand of consumers leads to defining a protocol. That is, the conventional communication protocols have a problem of having to install a new system according to a change in the demand or policy.

An embodiment of the present invention suggests details of the CR technique that does not require a change in the protocol even when a change has been made to the demand or policy. That is, the embodiment suggests a communication technology which is not affected by a change in frequency bands (i.e., spectrums) due to a change in the demand or policy.

An embodiment of the present invention suggests basic structures that next-generation communication terminals and systems have and also suggests a frequency utilization method and a basic structure that the next-generation communication protocol will need to have.

Reference will now be made to a hardware structure of a CR communication device (for example, a terminal and a base station) suggested in the embodiments.

Blocks, other than a radio frequency (RF) processing block, of the CR communication device are digitized and operate based on software, in contrast to conventional terminals.

Figure 1:
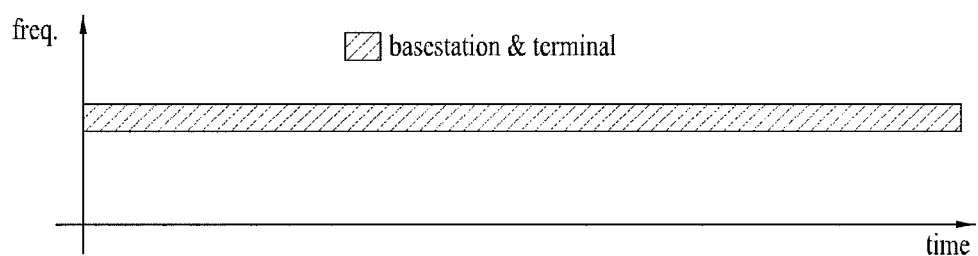
FIG. 1 illustrates use of wireless resources in a fixed bandwidth communication method.
Figure 2:
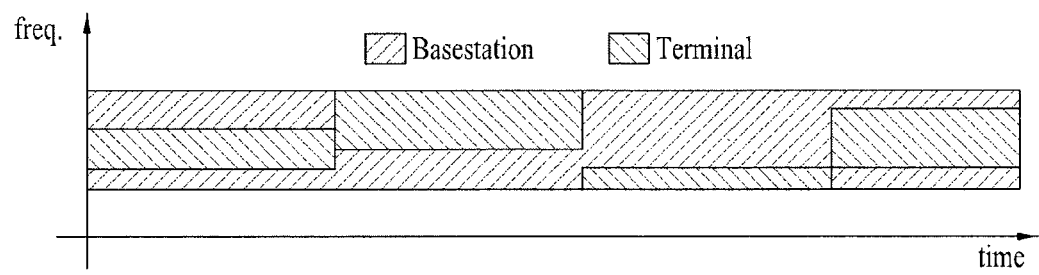
FIG. 2 illustrates use of wireless resources when a terminal uses a variable bandwidth while a base station uses a constant bandwidth.
Figure 3:
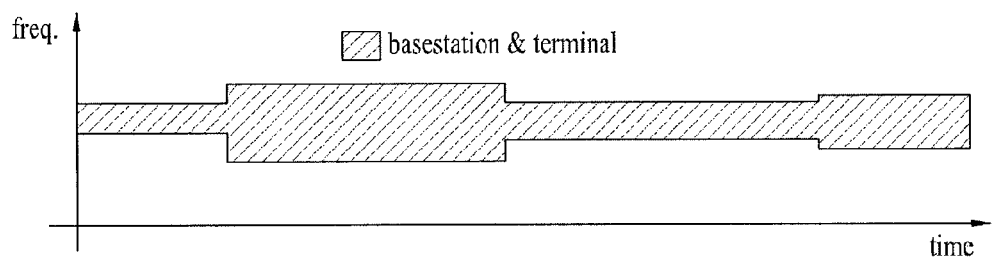
FIG. 3 illustrates a method of using wireless resources in a scalable bandwidth communication method that incorporates some features of a CR technique.
Figure 4:
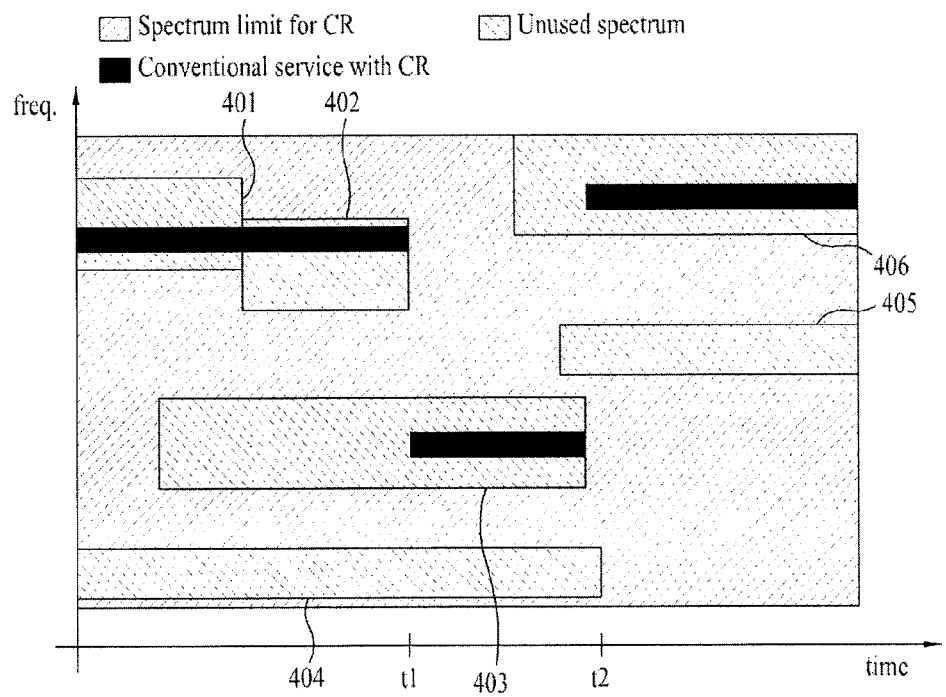
FIG. 4 illustrates how a CR terminal scans and uses wireless resources.
Figure 5A:
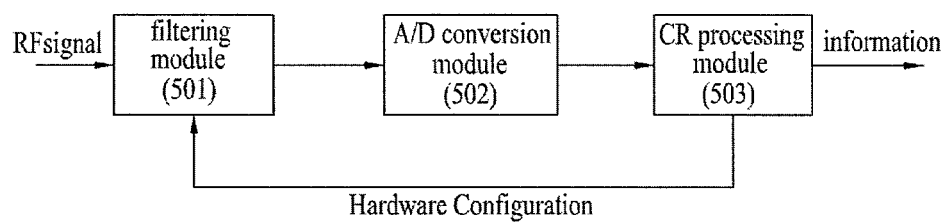
FIG. 5A is a block diagram showing an example of a CR communication device according to an embodiment of the present invention.

FIG. 5A is a block diagram showing an example of the CR communication device.

The CR communication device may need a filtering module 501 that selects a specific frequency band, which is part of the total frequency bands, since the CR communication device freely scans (or searches) frequency bands to receive or create a service from a specific frequency band. The filtering module 501 can be implemented using a bandpass filter that is controlled by a CR processing module 503 or a controller (not shown) that controls the general operation of the CR communication device. The bandpass filter can pass a specific frequency band in a scalable (or variable) manner An analog signal that passed through the filtering module 501 is converted into a digital signal through an analog to digital (A/D) conversion module 502. The output of the A/D conversion module 502 is input to the CR processing module 503. The CR processing module 503 performs data processing according to a variety of frequency control techniques described below. The CR processing module 503 is implemented by software and loads a module of a specific wireless protocol to perform desired CR processing as needed. That is, the CR communication device is based on the SDR.

Figure 5B:
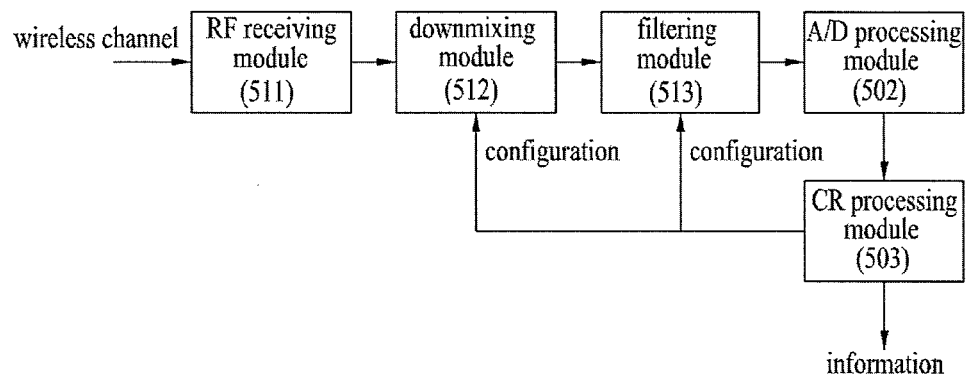
FIG. 5B is a block diagram showing another example of the CR communication device according to the embodiment.

However, there may be difficulties in implementing the communication device of FIG. 5A. It is also possible to perform the CR technique through a CR communication device as shown in FIG. 5B. For the current level of technologies, it is difficult to convert a wireless signal received from a wireless channel into a baseband signal at once and it may also be difficult to perform broadband processing and therefore another filter and baseband conversion through a mixer are needed. As shown, the CR communication device of FIG. 5B receives an RF signal through an RF receiving module 511. The RF signal is converted into an intermediate frequency (IF) signal through a downmixing module 512 and is then filtered by a filtering module 513. That is, an output signal of the filtering module 513 is a signal obtained from a frequency band that is to be used by the CR communication device. The output of the filtering module 513 is input to the A/D conversion module 502 and an output of the A/D conversion module 502 is input to the CR processing module 503. The downmixing module 512 may downmix a signal into baseband and the downmixed signal may be filtered and converted into a digital signal and then be input to the CR processing module 503.

Reference will now be made in detail to the structure and operation of the CR processing module 503 with reference to FIG. 6. The CR processing module 503 is implemented by software and thus the diagram of FIG. 6 illustrates a software structure of the CR processing module.

Figure 6:
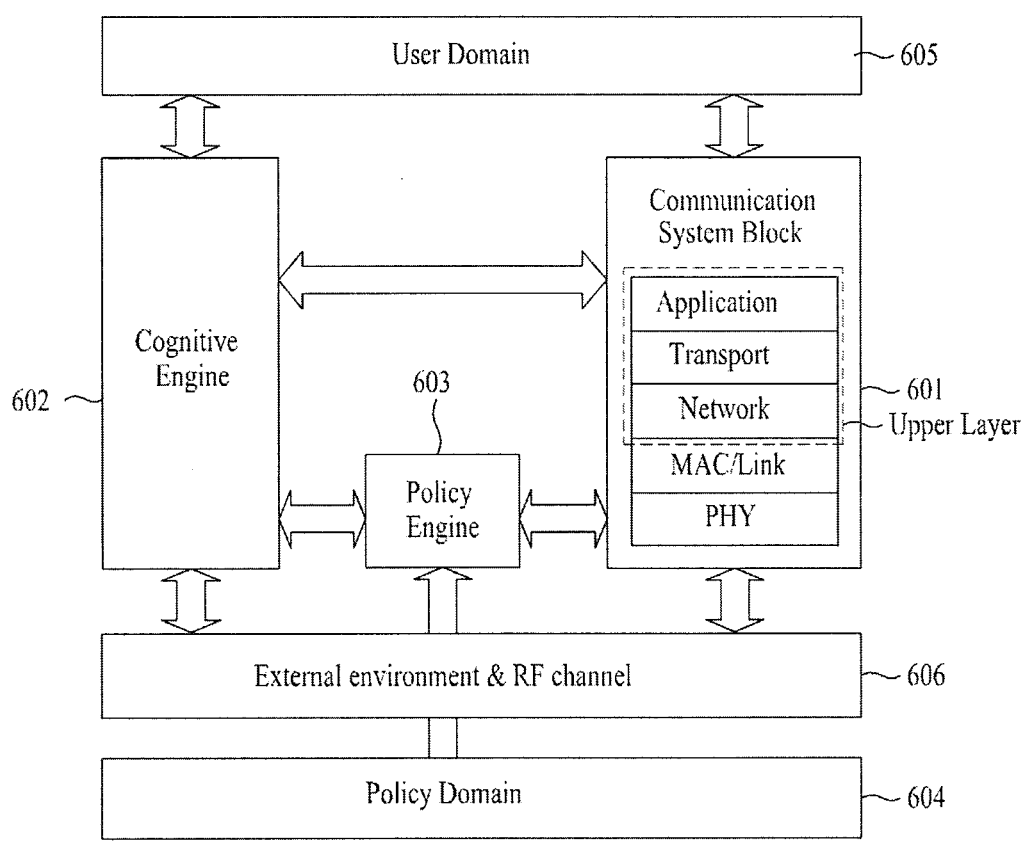
FIG. 6 is an example block diagram illustrating the configuration of a CR processing module included in the CR communication device according to the embodiment.

As shown in FIG. 6, the software structure of the CR processing module includes communication system blocks 601, a cognitive engine 602, and a policy engine 603.

As a software module that processes a communication signal in the CR communication device, each communication system block 601 performs data processing for actual communication. That is, the communication system block 601 performs data processing of a digital signal produced by conversion of the A/D conversion module 502 using a conventional communication protocol suggested in the past or a new communication protocol to be suggested in future. The communication system block 601 includes a platform MAC/PHY (i.e., a platform MAC/PHY block) and a component MAC/PHY (i.e., a component MAC/PHY block) that will be described later. A component MAC/PHY included in the platform MAC/PHY can be selected by the cognitive engine 602. Specifically, if it is decided to perform communication through a specific band selected by the frequency band scanning (or searching) of the cognitive engine 602, then one of the specific communication system blocks may be loaded to perform communication. Since the communication system block 601 performs data processing for actual communication, it is preferable that the communication system block 601 perform different data processing according to each layer such as PHY and MAC.

The shown communication system block 601 includes an application layer, a transport layer, a network layer, a MAC/LINK layer, and a PHY layer. The application layer is the top layer that is located nearest to the user and provides general services associated with applications of data communication. The main functions of the application layer include file transfer, email, remote login, network management, spreadsheet, word processing, and the like. The transport layer is responsible for end-to-end communication between two users that communicate with each other. Specifically, the transport layer provides a function to allow seamless and reliable data transmission without error from a transmitting end to a receiving end. That is, the transport layer provides establishment of a connection between users, maintenance of transmission, release of connection, flow control, error control, order (sequence) control, etc. The network layer provides connectivity and route selection between two systems that are located in different places. The network layer routes packets from a source to a destination. A routing protocol selects the optimal route through a network connected between the source and destination and a protocol of the network layer transfers information through the selected route.

Main functions of the network layer include data transfer, relay, route selection, and address determination for establishing a communication line.

The functions of the application, transport, and network layers may be implemented within a single layer. That is, a single upper layer including the application, transport, and network layers may be provided.

The MAC layer is used for reliable data transmission through a physical link. When specific communication devices communicate with each other through a specific service, the link layer is used to maintain information of connection between the communication devices. The PHY layer performs a function to establish a connection through a physical medium between communication devices. The MAC and link layers are implemented by a platform MAC that will be described later and the PHY layer is implemented by a platform PHY that will be described later.

The policy engine 603 of FIG. 6 performs management frequency policy. The frequency policy is information that includes information about which bands can be scanned and which bands cannot be scanned, information about which service is provided over a specific band, information about signal power with which it is possible to perform communication in a specific band, and the like. The frequency policy indicates a variety of control information of frequency bands which the cognitive engine 602 can scan. Since the basic concept of the CR technique is to freely scan (or search) frequency bands and to receive and create a service through a frequency band found by the scanning, it requires information about frequency policy of a country or region where communication devices are located. The policy engine 603 obtains, from a policy domain 604, information such as information as to whether or not a specific frequency band can be monitored, information as to whether or not a specific frequency band can be used, and information about a service that can be provided or created through each frequency band. The policy engine 603 can control the operations of the communication system blocks 601, the cognitive engine 602, and the like based on the information obtained from the policy domain 604. For example, when it is decided to increase transmission power for performing data communication through a specific frequency band obtained by the cognitive engine 602, it may conflict with the frequency policy of the region or country and thus it is preferable that communication be performed with transmission power determined under control of the policy engine 603.

The cognitive engine 602 traces instantaneous frequency band changes and performs an appropriate countermeasure. That is, the cognitive engine 602 determines which service is to be performed through which band according to information provided by the policy engine 603 and the usage state of the current spectrum (i.e., frequency band) and performs communication protocol control and optimization of the communication system block 601.

The cognitive engine 602 can receive, from a user domain 605, a specific request of the user of the CR communication device and can scan an external environment & RF channel 606 using a digital signal obtained from a wireless channel. Control of the policy engine 603 or the like may be applied even when it is decided to receive a specific service through this scanning. The cognitive engine 602 can select a specific communication system block 601 and apply a specific configuration to it and can also perform data processing of the external environment & RF channel 606. The operation of the communication system block 601 may also be controlled by the policy engine 603 according to the frequency policy.

If the communication system block 601 has a protocol capable of accommodating changing frequency bands, the cognitive engine 602 can perform communication according to the changing frequency band environments through the specific configuration of the communication system block 601. If the communication system block 601 cannot accommodate changing frequency bands, the cognitive engine 602 cannot control the configuration of the communication system blocks 601 so that it only functions to select a specific communication system block 601. That is, the CR communication device selects and uses one of the conventional protocols and thus it will perform operations supporting multimode services.

Reference will now be made in detail to the structure of the communication system block 601. As described above, a plurality of communication system blocks 601 is provided and the cognitive engine 602 can select one of the communication system blocks 601. In this case, this embodiment suggests that the communication system block is divided into one platform block and a plurality of component blocks included in the platform block.

Figure 7A:
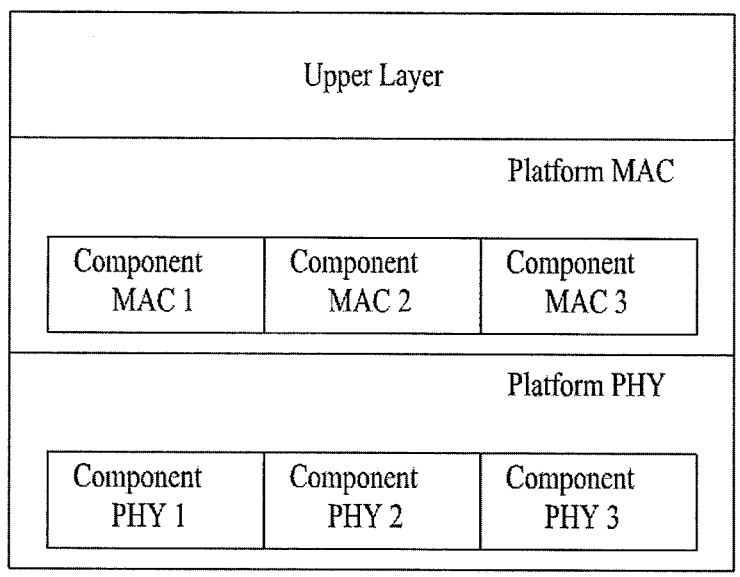
FIG. 7A is a block diagram illustrating an example of a communication system block included in the CR communication device according to the embodiment.

FIG. 7A illustrates an example of the communication system block according to this embodiment. As shown, MAC and PHY blocks of the communication system block 601 include platform MAC and PHY blocks, respectively. The platform MAC includes a plurality of component MACs (i.e., component MAC blocks) (component MAC 1, 2, 3). The platform PHY includes a plurality of component PHYs (i.e., component PHY blocks) (component PHY 1, 2, 3).

For allowing the communication system module to support changing frequency bands, it is undesirable that the communication system module include a single protocol that specifies the entirety as in the conventional technology. It is desirable that a protocol that actually supports a specific service be defined through individual component MACs or PHYs and that a platform MAC or PHY which manages each component be separately defined. That is, respective protocols of the platform MAC and PHY that supports MAC and PHY are defined and protocols in the form of components that can be accommodated in each platform protocol are created.

The platform MAC/PHY provides a basic protocol and interface to implement a communication system. That is, if the cognitive engine 602 finds a specific frequency and selects a service, this information is transferred to the platform MAC/PHY.

The platform MAC/PHY determines which communication protocol is used to perform communication in a band determined by the cognitive engine 602. That is, the platform MAC/PHY selects one of the plurality of component MACs/PHYs. In this case, the component MAC/PHY can provide a protocol and interface limited to a specific band. In this case, the platform MAC/PHY can set a configuration to allow communication in the band determined by the cognitive engine 602. That is, the platform MAC/PHY is an entity which supports a communication structure to perform communication according to the CR technique and the component MAC/PHY is an entity which performs data processing or the like for actual communication.

Figure 7B:
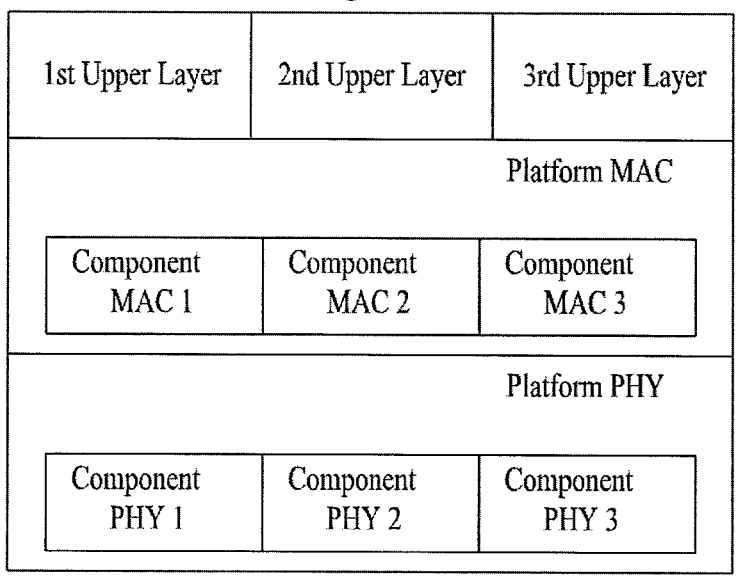
FIG. 7B is a block diagram illustrating another example of the communication system block included in the CR communication device according to the embodiment.

FIG. 7B illustrates another example of the communication system block according to this embodiment. The communication system block according this embodiment may include one upper layer and a corresponding platform MAC/PHY as shown in FIG. 7A and may also include a plurality of upper layers (first, second, and third upper layers) and a platform MAC/PHY as shown in FIG. 7B. A mobile terminal according to this embodiment can provide a variety of services and thus can include a plurality of upper layers according to the provided services.

Reference will now be made to detailed operations of the CR terminal with reference to FIGS. 6, 7A and 7B. For example, a user of the CR terminal can choose to receive both a 3GPP mobile communication service and a wireless LAN (WLAN) service. This choice of the user is provided to the cognitive engine 602 through the user domain 605. The cognitive engine 602 scans frequency bands based on frequency policy of the country or region under control of the policy engine 603 and discovers a 3GPP mobile communication service and a WLAN service in the region where the CR terminal is located. In this case, the cognitive engine 602 transfers this information to the platform MAC/PHY. The platform MAC/PHY loads a component MAC/PHY which processes a protocol and interface for conventional 3GPP mobile communication services and a component MAC/PHY which processes a protocol and wireless interface for conventional WLAN services. The platform MAC/PHY performs frequency configuration so as to provide the 3GPP and WLAN services through the frequency band discovered by the cognitive engine 602. Through this series of operations, the user can receive both the 3GPP mobile communication service and the wireless LAN service.

This embodiment suggests the protocol model as shown in FIG. 7 for the CR communication device that processes digital signals. The features of the platform MAC/PHY and the component MACs/PHYs can be understood from the above description.

The characteristics of the platform MAC/PHY can be divided into those of symbolic and detailed protocols according to the functions included in the components MACs/PHYs.

The platform MAC/PHY operates as a symbolic protocol if each component MAC/PHY independently performs spectrum sensing which is an operation for scanning frequency bands and selecting a specific band and defines an interface according to the sensed spectrum. That is, the platform MAC/PHY performs basic control such as control to transmit data received from the cognitive engine 602 to each component MAC/PHY if each component MAC/PHY supports the CR technique.

The platform MAC/PHY operates as a detailed protocol if each component MAC/PHY does not support the CR technique, i.e., if each component MAC/PHY has no function to communicate with CR communication devices to recognize and estimate changing frequency environments (i.e., the usage states of frequency bands that change with time). The component MACs/PHYs provide interfaces to receive or provide actual services if the platform MAC/PHY operates a detailed protocol.

The platform MAC/PHY operates as an operating platform for the component MACs/PHYs that provide actual services. That is, as a detailed protocol, the platform MAC/

PHY communicates with CR communication devices and performs spectrum sensing which is an operation for recognizing and estimating frequency band environments and then performs configuration of the sensed spectrum. For example, the platform MAC/PHY can set a specific control channel in a specific frequency band and can set specific data channels indicated by the control channel. The component MACs/PHYs can receive services using the spectrum (for example, the specific data channels) set by the platform MAC/PHY.

On the other hand, the component MACs/PHYs provide interfaces corresponding to specific services desired by the user, for example, interfaces corresponding to wireless services such as WLAN, mobile communication, WPAN, GPS, TV, and radio. The component MACs/PHYs can perform data processing of digital data received by the CR communication device according to specific communication standards (for example, WLAN, 3GPP, WPAN, GPS, and TV) and thus can provide interfaces corresponding to specific wireless services. The variety of interfaces of the component MACs/PHYs (for example, interfaces corresponding to WLAN, 3GPP, WPAN, GPS, and TV) can be freely selected under control of the platform MAC/PHY.

As described above, the platform MAC/PHY can perform spectrum sensing and configuration for the component MACs/PHYs. That is, the platform MAC/PHY can perform spectrum sensing which is an operation for scanning and analyzing frequency bands and spectrum configuration which is an operation for performing frequency configuration according to the sensing result. The component MACs/PHYs serve to provide and create actual services.

Reference will now be made to a detailed method for performing spectrum sensing and spectrum configuration of the platform MAC/PHY. The platform MAC/PHY performs the following four operations. First, the platform MAC/PHY performs cognitive learning in conjunction with the cognitive engine 602. Second, the platform MAC/PHY performs dynamic service spectrum control. Third, the platform MAC/PHY performs channel configuration. Fourth, the platform MAC/PHY performs payload management for component MACs/PHYs.

First, reference is made to the cognitive learning of the platform MAC/PHY.

The cognitive learning, which is an important part of the communication of the CR technique, is a process for distinguishing between frequency regions that are being used and frequency regions that are not being used in the frequency band and determining which protocol is being used in which spectrum. To perform the cognitive learning, it is desirable that the CR communication device monitor and estimate frequency bands and provide corresponding information to other CR communication devices. For example, if a CR terminal independently monitors frequency bands when there is a problem in communication between the CR terminal and a CR base station, there will be limitations in frequency bands that can be monitored (for example, a limitation due to processing capacity or signal attenuation with the distance). Even when the CR base station independently monitors frequency bands, the CR base station will not be able to monitor all frequency bands. Accordingly, the CR terminal and CR base station can share their frequency band monitoring results. That is, the cognitive learning can be divided into local learning that is based on standalone determination (or estimation) of each CR terminal and distributed learning that is based on information provided by a number of CR terminals on the entire network.

Figure 8:
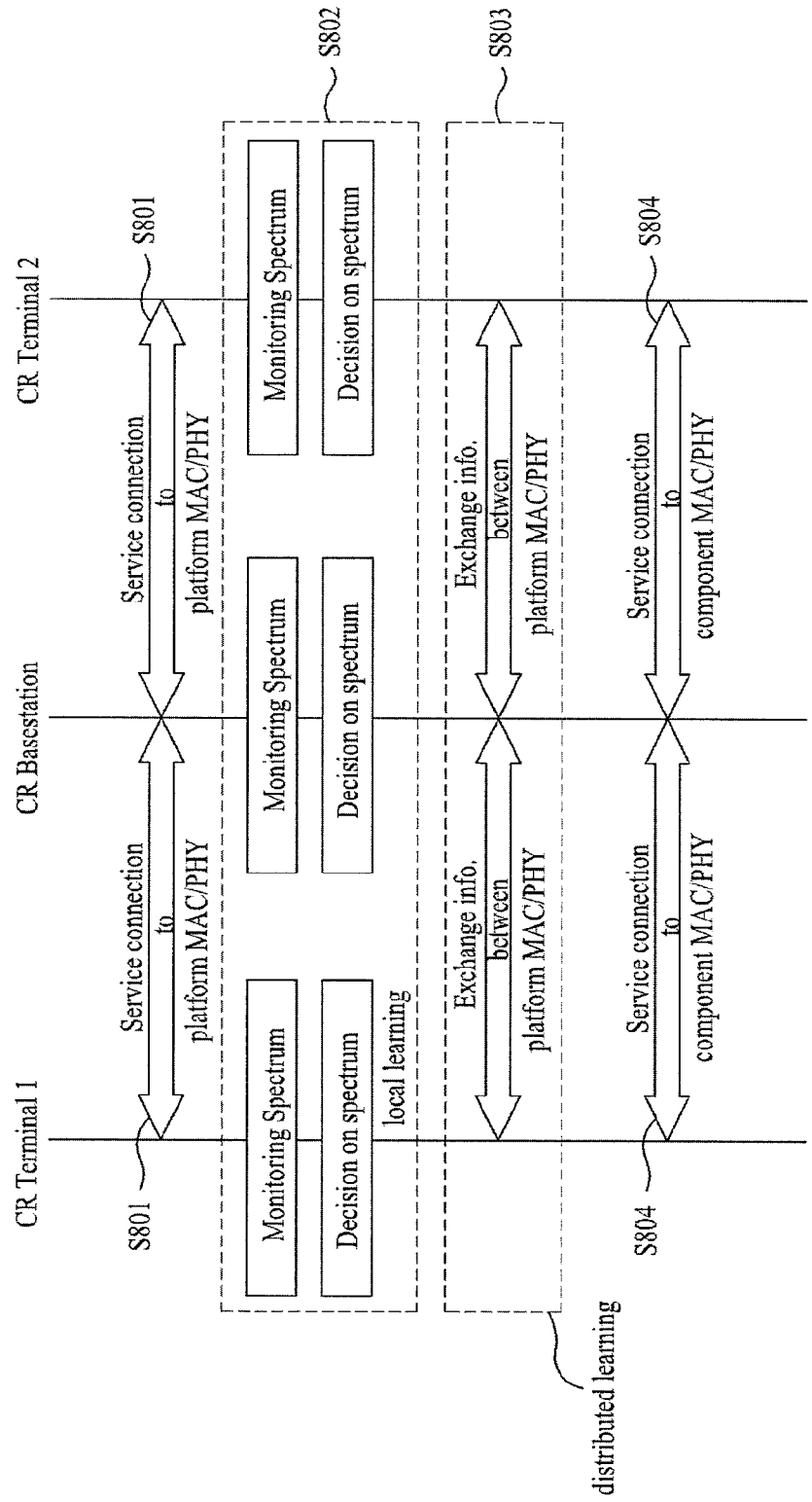
FIG. 8 illustrates an example of a cognitive learning method according to the embodiment.

FIG. 8 illustrates a method for cognitive learning on a network including CR terminal and a CR base station. As shown, a platform MAC/PHY of each of the CR terminals and the CR base station establishes a connection to communicate a service with each other (S801). That is, to approach the base station, the CR terminal monitors spectrums on its own and recognizes a signal transmitted by a platform MAC/PHY of the base station. Then, the CR terminal accesses the base station to obtain other service parameters. The step S801 may also be performed after step S802 or S803.

S802 denotes the step of local learning Each of the CR terminals and the CR base station monitors scannable frequency bands (spectrums) and determines which service is being provided in which frequency band.

S803 denotes the step of distributed learning Here, each of the CR terminals and the CR base station can exchange information about which frequency band is empty or information about which frequency band can be used to receive a service through the local learning step. Through step S803, each terminal transfers its independently monitored spectrum information to the base station so that the base station can collect overall spectrum information.

When a connection has been established between platform MACs/PHYs through steps S801 to S803, the platform MACs/PHYs determine and load component MACs/PHYs according to the service provided and establish a connection between the component MACs/PHYs (S804). Then, the CR terminal accesses a component MAC/PHY of a specific service to receive the service and continues communication with the platform MAC/PHY while receiving the service.

The CR terminal performs operations for the cognitive learning in the following order. First, the platform MAC/PHY obtains information received from a wireless channel and transfers information of the received signal to the cognitive engine 602. Under control of the policy engine 603 or the like, the cognitive engine 602 transfers frequency band scan results and information about which service is available to the platform MAC/PHY. The platform MAC/PHY completes the cognitive learning and gives feedback information to the cognitive engine 602 and loads a component MAC/PHY to receive an actual service. That is, the cognitive engine 602 and the platform MAC/PHY function together to perform the cognitive learning and, based on the cognitive learning results, it is possible to determine component MACs/PHYs that are actually to be provided and also to set parameters of the determined component MACs/PHYs.

Figure 9:
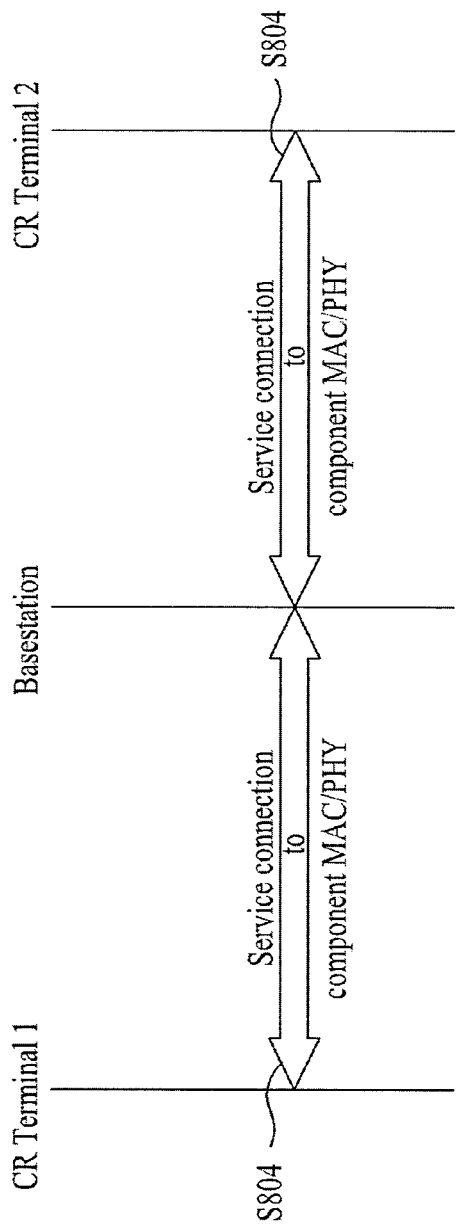
FIG. 9 illustrates another example of the cognitive learning method according to the embodiment.

FIG. 9 illustrates a method for cognitive learning on a network including CR terminal and a conventional base station.

In the case of FIG. 9, the CR terminal does not need to perform local learning and distributed learning since the base station does not support the CR technique. The platform MAC/PHY loads component MACs/PHYs which can communicate with the base station and performs configuration of each component MAC/PHY and then receives a service (S804).

Reference will now be made to dynamic service spectrum control of the platform MAC/PHY.

The platform MAC/PHY determines a spectrum through cognitive learning and then sets how CR communication devices will set spectrums. That is, the platform MAC/PHY dynamically determines a required frequency bandwidth based on frequency band analysis results, the number of component MACs/PHYs associated with services that are provided, and the total amount of traffic.

Figure 10:
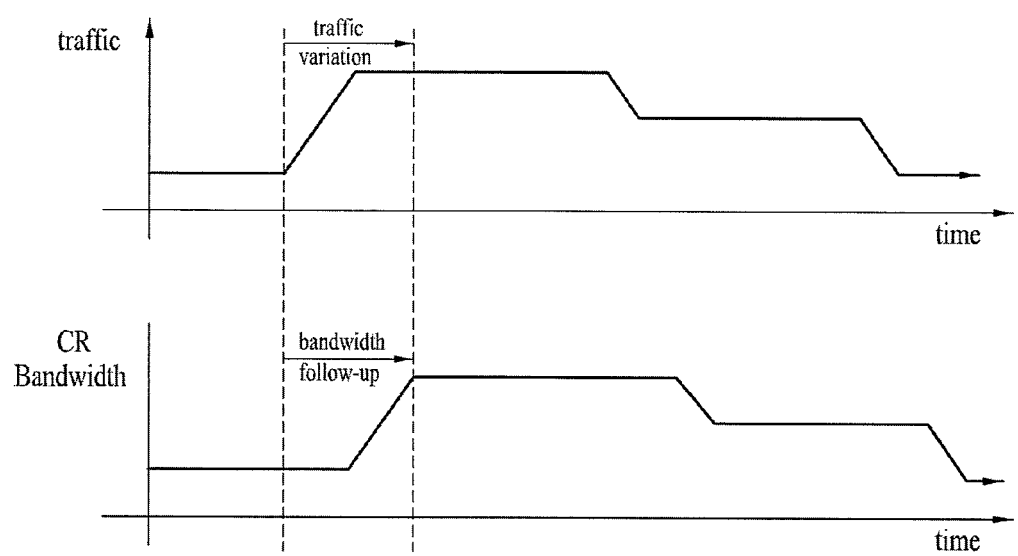
FIG. 10 illustrates a frequency bandwidth that a platform MAC/PHY determines according to the amount of data to be processed by a CR communication device.

FIG. 10 illustrates a frequency bandwidth that the platform MAC/PHY determines according to the amount of data to be processed by the CR communication device.

In the case of the conventional communication technology, there is a limitation to the frequency band and therefore the quality of service (for example, QoS) is reduced if the demand for the service is still increased after all frequency resources are used.

However, the platform MAC/PHY is based on the CR technique which freely scans frequency bands to discover a desired service and to use a frequency band that is not in use. Accordingly, the platform MAC/PHY can freely control the frequency bandwidth according to an increase in the traffic. That is, bandwidths of CR communication devices form an instantaneous borrow/lend relation. When it is necessary to traffic a greater amount of traffic, the platform MAC/PHY can perform dynamic allocation to allow use of more frequency resources. The platform MAC/PHY can also reduce the bandwidth used if the amount of traffic is reduced. The platform MAC/PHY controls the frequency bandwidth according to the total amount of traffic and the spectrum state. Accordingly, the platform MAC/PHY can increase the frequency band to the maximum bandwidth capable of processing all traffic if there are sufficient frequency bands that are available without conflicting with the frequency policy of the country or region. The platform MAC/PHY can reset the frequency band used according to the type of a required service, the channel state, and the total amount of traffic.

On the other hand, if a number of CR terminals communicate with one CR base station, it may cause a problem of collision of frequency bands used by the wireless terminals. Accordingly, it is preferable that each CR communication device provide a protocol for sharing specific frequency bands to achieve coexistence for use of the frequency bands without collision with other CR communication devices.

As shown in FIG. 10, if traffic is increased, the CR communication device can monitor frequency bands through the cognitive learning described above and can determine a service and a band to be used. In this case, the platform MAC/PHY can set each component MAC/PHY so as to perform communication through a wider frequency band based on the result of monitoring of frequency bands through the cognitive learning, the number of component MACs/PHYs used in the service, and the increased amount of traffic. The CR technique has an advantage in that it processes traffic through a wide frequency band since there is no limitation to the frequency band in terms of the characteristics of the CR technique, provided that it does not conflict with the frequency policy of the region or country.

Reference will now be made to channel configuration of the platform MAC/PHY.

It is preferable that a platform MAC/PHY of each CR communication device perform channel configuration of a control channel and a basic data channel for communication with other CR communication devices. In the following description, this channel configuration is exemplified by a control channel and a basic data channel configured by a platform MAC/PHY of a CR base station.

The control channel defines bandwidths to be used by the CR communication device and the types of services for the bandwidths. The control channel is used for connection between platform MACs/PHYs of a plurality of CR terminals and a platform MAC/PHY of a base station. The term "basic data channel" refers to a channel that serves as both a basic data channel and a control channel.

Figure 11:
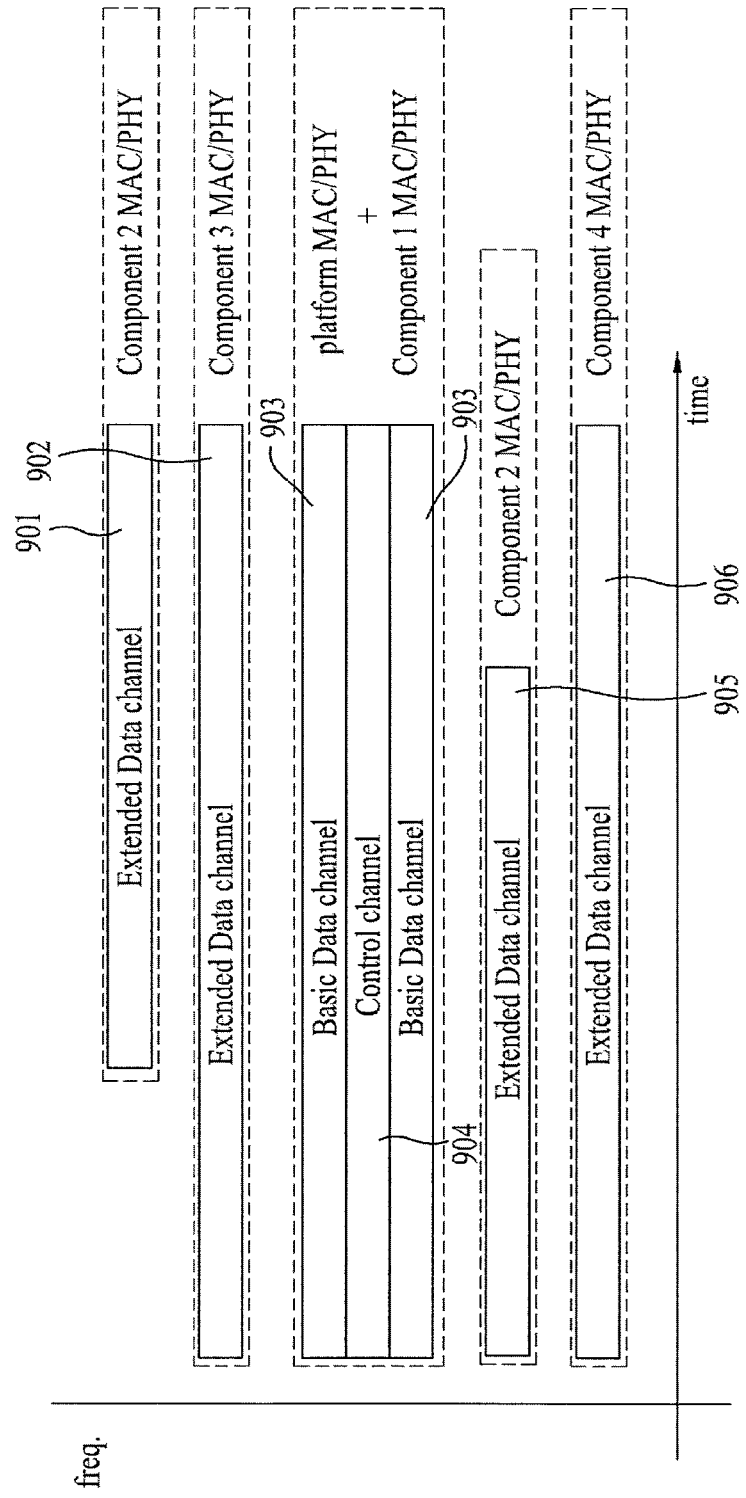
FIG. 11 illustrates the concept of channel configuration performed by a CR communication device.

FIG. 11 illustrates the concept of channel configuration performed by the CR communication device.

A control channel 904 in FIG. 11 provides information regarding the amount of frequency resources to be used by the platform MAC/PHY, i.e., the amount of spectrums. The control channel 904 in FIG. 11 also provides channel information of a plurality of data channels 901, 902, 903, 905, and 906. That is, the platform MAC/PHY of the CR terminal that communicates with the CR base station establishes a connection with the platform MAC/PHY of the CR base station through the control channel 904. Through this connection, the CR terminal can determine frequency bands over which it can perform communication and determine which services are provided through the frequency bands. The control channel 904 also contains information about the way in which the CR terminal has to access each channel. It is preferable that the control channel 904 be determined according to the results of frequency band scanning by the CR communication device.

The basic data channel 903 of FIG. 11 may include information that can be included in the control channel 904. That is, the basic data channel 903 may be a channel extended from the control channel. For example, when the CR base station must provide a service through a broad band, a problem may occur in that all control information cannot be transmitted through the control channel 904. In this case, the basic data channel 903 can function as part of the control channel 903. The basic data channel 903 can also function as a data channel, similar to the other extended data channels 901, 902, 905, and 906. Services provided through the basic data channel 903 may be mandatory services that must be essentially provided by the communication protocol.

As shown in FIG. 11, the CR technique is characterized in that frequency bands used by channels change with time since the CR technique is not limited to specific frequency bands. In the case of FIG. 11, the data channels 901, 902, 903, 905, and 906 are used by different component MACs/PHYs. That is, the first of the specific services is provided by a second component MAC/PHY (Component 2 MAC/PHY) through the data channels 901 and 905. The second service is provided by a third component MAC/PHY (Component 3 MAC/PHY) through the data channel 902. The third service is provided by a first component MAC/PHY (Component 1 MAC/PHY) through the data channel 903 and the fourth service is provided by a fourth component MAC/PHY (Component 4 MAC/PHY) through the data channel 906.

As shown, each service may be provided through adjacent frequency bands or through separate frequency bands depending on the configuration (or setting) of the platform MAC/PHY. Similarly, a single component MAC/PHY may communicate through adjacent frequency bands or through separate frequency bands depending on the configuration of the platform MAC/PHY.

Reference will now be made to a payload management for component MACs/PHYs.

As described above, if the platform MAC/PHY determines the amount of a spectrum to be used, this data is standardized and broadcast through a control channel such as the channel 904 of FIG. 11 to inform all terminals of the determined amount of the spectrum. Through this broadcast data, CR terminals receive their desired services from a corresponding base station.

Actually, the CR terminal receives a service through a component MAC/PHY. That is, component MACs/PHYs of the CR terminal provide interfaces for services. The component MACs/PHYs are divided into two modes according to whether or not they have a standalone transmission signal protocol (i.e., an RF signal protocol). In the case of the first mode, a physical transmission signal protocol of the component MAC/PHY complies with the protocol of the platform MAC/PHY while an inner payload structure alone is implemented using the component MAC/PHY. In the case of the second mode, a physical transmission signal protocol of the component MAC/PHY is defined independently. The first mode is a dependent component MAC/PHY definition method and the second mode is an independent component MAC/PHY definition method.

The following is a description of the dependent component MAC/PHY definition method. In this case, since physical signal protocols of the component MACs/PHYs of the terminal are defined according to the protocol of the platform MAC/PHY, the component MACs/PHYs of the terminal can directly access services without undergoing a process such as individual physical synchronization or virtual base station scanning according to each service. However, it is preferable to define dependent component MACs/PHYs that provide access structures capable of providing different qualities of service (QoS) according to supported traffic types while providing separate definitions of transmission chains of up/down links defined according to the service protocol. The transmission chain corresponds to the order of packets transferred from an upper layer (for example, a layer provided above the MAC layer) and is valid until it is transmitted as a physical signal. Examples of the transmission chain include retransmission, scheduling, channel coding, Hybrid ARQ, MIMO, and fragmentation. The QoS of a packet transmitted according to the transmission chain is determined according to the transmission format or structure of the packet. Each QoS can be classified according to the protocol type. For example, the WLAN does not support real time transmission while the IEEE 802.16e supports real time transmission. Accordingly, it is preferable to provide access structures capable of providing different QoS according to the supported traffic types.

Reference will now be made to an independent component MAC/PHY definition method. In this case, after the platform MAC/PHY determines a frequency band, the fact that a specific service is in use in a specific band is marked in a control channel. For example, notification that a specific service is provided through the bands 901 to 906 is provided through the channel 904 in FIG. 11. A physical transmission signal protocol for accessing each band to receive a service is defined in each component MAC/PHY. That is, the independent component MAC/PHY definition method is a method in which the platform MAC/PHY performs an operation for providing information about each band through a control channel and the component MACs/PHYs perform the other operations. This method will be preferred since it can accommodate a variety of current wireless communication devices without change. In this case, the platform MAC/PHY must provide information regarding a channel which each component MAC/PHY must access since each component MAC/PHY provides an interface for a conventional limited bandwidth (for example, a specific bandwidth used in the conventional CDMA communication protocol). That is, the platform MAC/PHY needs to define interfaces for the control channel (for example, the channel 904 of FIG. 11) and a data channel (for example, the channel 903 or a data channel included in the channel 904) that must be defined and to instruct a specific component MAC/PHY to be used for an extended band (for example, the channel 901, 902, 905, or 906 of FIG. 11).

The platform MAC/PHY concept can be advantageously used for communication providers that provide services to regions with different populations. That is, the platform MAC/PHY concept makes it possible not only to provide the method of providing a service according to the amount of traffic as described above but also to provide a different service according to the region where the service is provided. For example, it is possible to provide a new service competition mode taking into consideration that fact that rural and urban areas have different populations of users.

Figure 12:
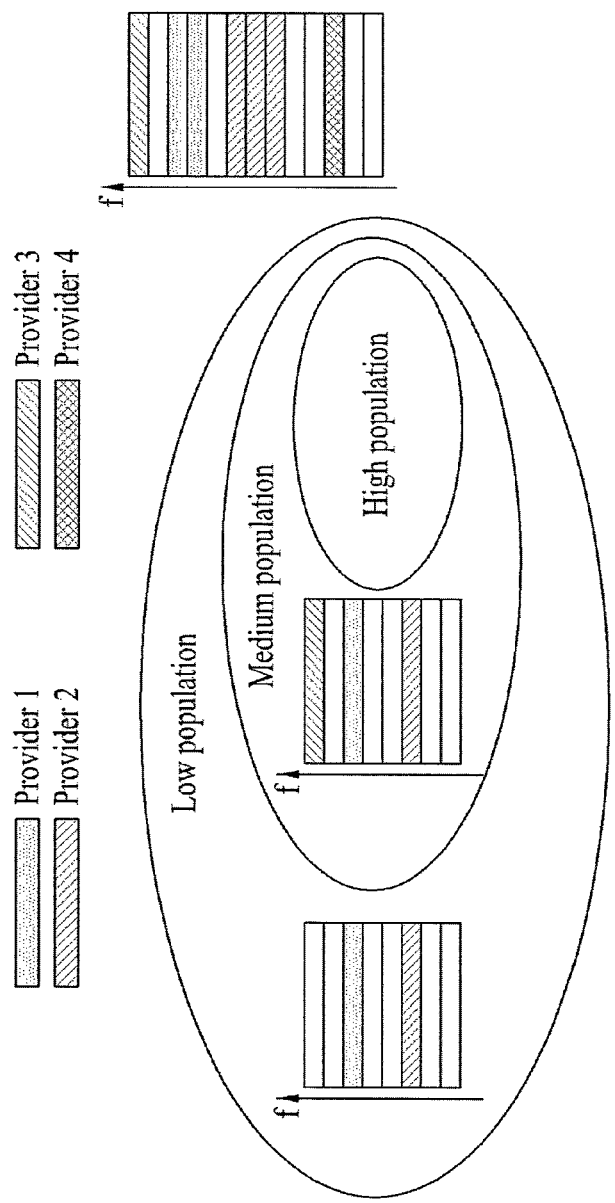
FIG. 12 illustrates frequency bands used in areas with different populations of users.

FIG. 12 illustrates frequency bands used in areas with different populations of users.

In FIG. 12, "Provider 1" and "Provider 2" denote dominant providers in the market. According to the CR technique, different providers may coexist with bands of providing specific services for CR terminals In this case, dominant providers in the market may install CR communication devices in all areas with high populations of users and all areas with low populations of users in order to provide services to all the areas. However, it is difficult for general providers to install CR communication devices in all areas with high populations of users and all areas with low populations of users even though they desire to provide their services to all the areas. In this case, general providers may install their CR communication devices (for example, CR base stations) only in areas with high user populations while providing services through CR communication devices of dominant providers in areas with low user populations. Particularly, different providers may share the same bands through the CR technique and each provider may charge fees for their unnecessary bands to other providers after lending the unnecessary bands to them. In another possible method, a specific provider borrows frequency bands from other providers for further use of bands capable of providing services.

Those skilled in the art will appreciate that the present invention may be embodied in other specific ways than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

The present invention can achieve the following advantages. First, the present invention allows efficient use of idle spectrums. A specific embodiment of the present invention also allows different providers to share spectrums allocated to the providers.

An embodiment of the present invention defines a comprehensive MAC/PHY format for CR terminals. This embodiment can provide a variety of qualities of service (QoS) since service types usable in CR communication devices are implemented in platform MACs/PHYs. According to an embodiment, it is possible to effectively eliminate channel congestion that users feel for burst traffic, compared to the method of reducing the QoS provided to the users.

Each of the embodiments of the present invention suggests a standard protocol form that can evolve on its own. That is, the present invention can provide CR terminals with a comprehensive framework for both current wireless communication technologies and future communication technologies.

What is claimed is:

1. A method for a terminal to communicate with a network using a plurality of frequency band cells, the method comprising:
    acquiring frequency bands information on which of frequency bands measurement can be performed and on which of the frequency bands measurement cannot be performed, wherein the frequency bands information is acquired from outside of the terminal;
    performing measurement on the frequency bands on which measurement can be performed based on the frequency bands information;
    acquiring measurement result information on the plurality of frequency band cells based on the measurement; and
    communicating data with a network on the plurality of frequency band cells considering the measurement result information.

2. The method of claim 1, wherein the frequency bands information includes a list of blacklisted cells which are not considered at performing measurement.

3. The method of claim 1, wherein the plurality of frequency band cells includes a primary frequency band cell, and
    wherein the primary band cell is used for receiving access information about the plurality of frequency band cells.

4. The method of claim 1, wherein the plurality of frequency band cells includes a frequency band cell including contiguous frequency bands.

5. The method of claim 1, wherein the plurality of frequency band cells includes a frequency band cell including non-contiguous frequency bands.

6. A terminal configured to communicate with a network using a plurality of frequency band cells, the terminal comprising:
    a transceiver configured to transmit and receive radio frequency signals; and
    a processor connected to the transceiver and configured to:
        acquire frequency bands information on which of frequency bands measurement can be performed and on which of the frequency bands measurement cannot be performed, wherein the frequency bands information is acquired from outside of the terminal,
        perform measurement on the frequency bands on which measurement can be performed based on the frequency bands information,
        acquire measurement result information on the plurality of frequency band cells based on the measurement, and
        communicate data with a network on the plurality of frequency band cells considering the measurement result information.

7. The terminal of claim 6, wherein the frequency bands information includes a list of blacklisted cells which are not considered at performing measurement.

8. The terminal of claim 6, wherein the plurality of frequency band cells includes a primary frequency band cell, and
    wherein the primary band cell is used for receiving access information about the plurality of frequency band cells.

9. The terminal of claim 6, wherein the plurality of frequency band cells includes a frequency band cell including contiguous frequency bands.

10. The terminal of claim 6, wherein the plurality of frequency band cells includes a frequency band cell including non-contiguous frequency bands.

* * * * *